(12) United States Patent
Rohrbach et al.

(10) Patent No.: US 6,645,447 B2
(45) Date of Patent: *Nov. 11, 2003

(54) DEVICES AND METHOD FOR CHEMICAL REACTIVE FILTRATION

(75) Inventors: Ron Rohrbach, Flemington, NJ (US); Dan Bause, Flanders, NJ (US); Peter Unger, Morristownship, NJ (US)

(73) Assignee: Honeywell International Inc., Morristown, NJ (US)

( * ) Notice: Subject to any disclaimer, the term of this patent is extended or adjusted under 35 U.S.C. 154(b) by 128 days.

This patent is subject to a terminal disclaimer.

(21) Appl. No.: 09/833,276

(22) Filed: Apr. 11, 2001

(65) Prior Publication Data

US 2001/0036431 A1 Nov. 1, 2001

Related U.S. Application Data

(63) Continuation-in-part of application No. 09/422,039, filed on Oct. 20, 1999, now Pat. No. 6,296,821, and a continuation-in-part of application No. PCT/US00/28680, filed on Oct. 17, 2000.

(51) Int. Cl.[7] .............................. C01C 1/10; C01C 1/12; B01D 39/04
(52) U.S. Cl. ................. 423/237; 423/239.1; 423/244.1; 423/245.1; 55/524; 55/527; 95/211; 95/214; 96/296
(58) Field of Search ...................... 55/529, 527, DIG. 5; 95/211, 214, 285; 96/296, 290; 423/235, 237, 239.1, 244.01, 245.1; 422/168, 169, 171, 177

(56) References Cited

U.S. PATENT DOCUMENTS

| | | | |
|---|---|---|---|
| 5,057,368 A | 10/1991 | Largman et al. | ............ 428/397 |
| 5,704,966 A | 1/1998 | Rohrbach et al. | ............. 95/170 |
| 5,713,971 A | 2/1998 | Rohrbach et al. | ............. 55/233 |
| 5,759,394 A | 6/1998 | Rohrbach et al. | ........... 210/264 |
| 5,891,221 A | 4/1999 | Rohrbach et al. | ............. 95/159 |
| 5,902,384 A | 5/1999 | Rohrbach et al. | ............. 96/296 |
| 5,942,323 A | 8/1999 | England | ..................... 428/323 |
| 5,951,744 A | 9/1999 | Rohrbach et al. | ............. 96/154 |
| 6,296,821 B1 * | 10/2001 | Hendricks et al. | .......... 423/237 |

FOREIGN PATENT DOCUMENTS

| | | |
|---|---|---|
| WO | WO 00/16877 | 3/2000 |
| WO | WO 01/28657 | 4/2001 |

OTHER PUBLICATIONS

PCT International Search Report.
PCT Written Opinion.

* cited by examiner

*Primary Examiner*—Stanley S. Silverman
*Assistant Examiner*—Maribel Medina
(74) *Attorney, Agent, or Firm*—Sandra P. Thompson; Bingham McCutchen LLP

(57) ABSTRACT

A gas contaminant is filtered using fibers having internal cavities containing a chemically reactive oxidizing agent, an acid or base, a coordinating agent, a complexing agent, or a deliquescing agent. Where the contaminant is basic, the reagent is preferably an oxidizing agent. Where the contaminant is acidic, the reagent is preferably basic, and more preferably comprises a group 1 or group 2 metal cation. The reagent may also advantageously comprise a phosphate, chitosan, hypochlorite, borate, carbonate, hydroxide, or oxide. Where the contaminant is neutral, the reagent is preferably an oxidizing agent, complexing agent, coordinating agent, or deliquescing agent. The reagent is preferably impregnated into an adsorptive solid, including, for example, carbon powder, zeolite, aluminum oxide, or silica. The fibers are preferably multilobal, and most preferably either trilobal or quadrilobal. It is also preferred that the fibers contain a plurality of T shaped lobes.

23 Claims, 5 Drawing Sheets

DEVICES AND METHOD FOR CHEMICAL REACTIVE FILTRATION

This application is a continuation-in-part of U.S. application Ser. No. 09/422,039 filed on Oct. 20, 1999, now U.S. Pat. No. 6,296,821 and PCT/US00/28680 filed Oct. 17, 2000.

FIELD OF THE INVENTION

This invention relates to a filter system and specifically to a system utilizing solid and liquid reagents.

BACKGROUND OF THE INVENTION

It is conventionally known to use activated charcoal and other materials as adsorptive elements to remove impurities from an air stream. With the advent of effective fiber cross sections, it is possible to produce fibers which are partially hollow. A particularly effective cross section is one having three T-shaped lobes extending from a central core, as described in U.S. Pat. No. 5,057,368, "Filaments Having Trilobal Or Quadrilobal Cross-Sections" to Largman et al., which is incorporated herein by reference. Conventional filters have used filtering media coated with solid or liquid materials in a variety of applications; however, many of these applications have relied on absorption, rather than adsorption. Adsorption occurs where particles to be removed attach to the surface of the filter material elements; whereas, absorption occurs where molecular motion mobility is harnessed to move unwanted particles from one zone to another in a non-mechanical manner. The multilobal fiber has been particularly effective as a wicking fiber where certain contaminant-removing liquids or solids are filled in cavities formed within the fiber.

The multilobal fiber filled with solid filtering particles have been used in adsorptive air filtration and odor-removing applications. Such filtering particles have included the use of carbon particles, zeolites, baking soda, cyclodextrins, and solids which could adsorb certain contaminants (see U.S. Pat. No. 5,759,394, which is incorporated herein by reference). Other applications utilizing multilobal-type fibers as wicking fibers also have involved absorptive properties of certain liquids which are filled within the cavities of the fibers. These liquids were typically chosen to lightly absorb odor and gas molecules in a reversible manner from a contaminated air stream to aid in the eventual dispersion of these molecules into a second air stream (see U.S. Pat. Nos. 5,891,221 and 5,704,966, which are incorporated herein by reference).

Maintaining environments free of contaminants is particularly critical in the manufacturing of integrated circuits because wafers are very susceptible to small particles and low levels of certain chemicals. This can be done by manufacturing wafers inside clean rooms with filtered air. The filters are used to reduce particle and chemical levels to extremely low levels (less than 1 part-per-billion). Semiconductor tools are also sometimes equipped with environmental controls that provide local ultra clean airflow during processing. However, conventional chemical filters have a very short life span, require frequent replacement, and are ineffective at efficiently filtering out certain chemicals.

The priority application teaches filtering of basic gases using fibers having longitudinally extending internal cavities that contain a reagent that chemically reacts with the basic gas. Preferred reagents include an acid, a coordinating agent, a complexing agent, and a deliquescent agent, and may advantageously be impregnated into an adsorptive solid. At the time, it was not recognized that basic gases could also be filtered using an oxidizing reagent, or that acidic or neutral gases could be filtered in an analogous manner. Thus, there is still a need to provide devices and methods for filtering various gases.

SUMMARY OF THE INVENTION

The present invention provides devices and methods in which a gas contaminant is filtered using fibers having internal cavities that contain a chemically reactive oxidizing agent, a hydrogen ion acceptor or donor, a coordinating agent, a complexing agent, or a deliquescing agent.

The gas contaminant may be acidic, basic, or pH neutral. Where the contaminant is basic, the reagent can be any acid, but is preferably an oxidizing agent. Where the contaminant is acidic, the reagent is preferably basic, and more preferably comprises a group 1 or group 2 metal cation, preferably of the following anions: a phosphate, chitosan, a hypochlorite, a borate, a carbonate, an hydroxide, or oxide. Where the contaminant is neutral, the reagent is preferably a complexing agent, a coordinating agent, an oxidizing agent, or a deliquescing agent.

In preferred embodiments the reagent comprises a metal cation, especially a group 1 or group 2 metal cation. The reagent may also advantageously comprise a phosphate, chitosan, a hypochlorite, a borate, a carbonate, an hydroxide, or oxide The reagent is preferably impregnated into an adsorptive solid, including, for example, carbon powder, zeolite, aluminum oxide, or silica.

The fibers are preferably multilobal, and most preferably either trilobal or quadrilobal. It is also preferred that the fibers contain a plurality of T shaped lobes.

Various objects, features, aspects, and advantages of the present invention will become more apparent from the following detailed description of preferred embodiments of the invention, along with the accompanying drawings in which like numerals represent like components.

BRIEF DESCRIPTION OF THE DRAWINGS

Use of the same reference symbols in different figures indicates similar or identical items.

DETAILED DESCRIPTION

Figure 1:
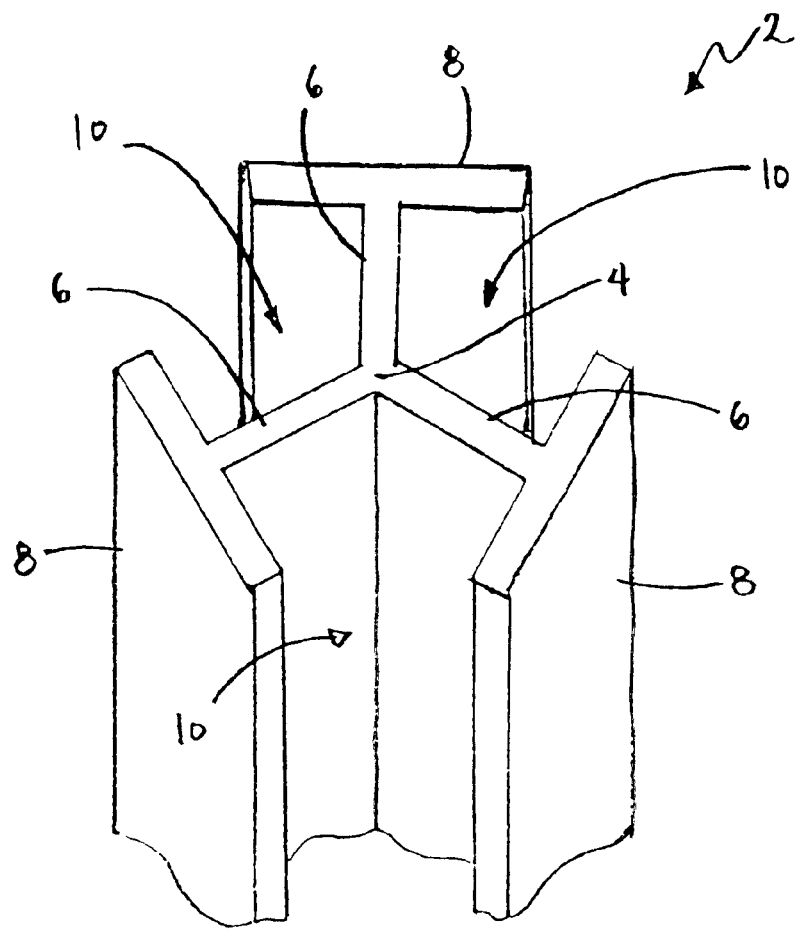
FIG. 1 shows a detailed cross-sectional view of an individual multilobal fiber.

FIG. 1 shows a detailed view of a cross section of an individual multilobal fiber 2. Fiber 2 is a type of fiber made of thermoplastic polymers and formed by conventional fiber forming techniques, such as spinning a fiber composition through a conventional spinneret, as described in the above-referenced U.S. Pat. No. 5,057,368. Fiber 2 includes a core 4, from which three lobes 6 extend outwardly. Each of lobes 6 terminates with a cap 8 which is perpendicularly attached to the end of lobe 6. The cavity formed between lobe 6 and adjacent caps 8 runs along the entire length of multilobal fiber 2 forming longitudinal slot 10. Multilobal fiber 2 has the ability to retain powdered particulate matter, such as powdered carbon. The carbon powder can be mechanically held within slot 10 entrapped by caps 8 without the use of any liquids. Entrapping the powder within slot 10 can be accomplished by dusting the powder into the fibers and then shaking off the excess powder or blowing the excess powder off with a fan.

Figure 2:
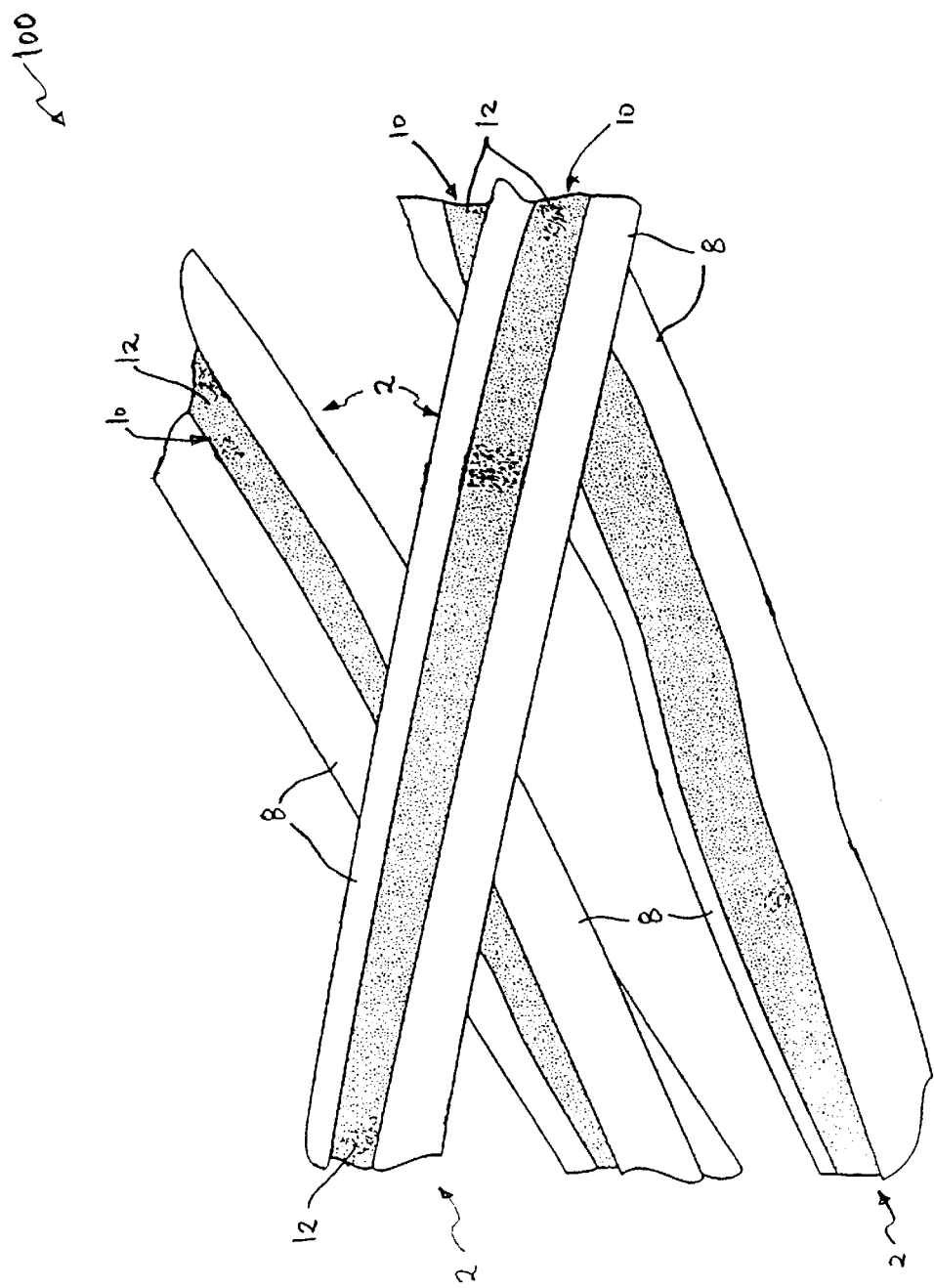
FIG. 2 shows a close-up view of a fiber mat made of multilobal fibers with a reagent disposed within each multilobal fiber.

Preferably, fiber 2 can hold, through capillary forces, liquids within slot 10. FIG. 2 shows a close-up view of fiber mat 100 where liquid reagent 12 is filled within slots 10 of meshed fibers 2. Liquid reagent 12 can be utilized to fill slots 10 by having liquid droplets penetrate fiber mat 100 and wicking into slots 10 after impacting with the surfaces of fibers 2. After the liquid droplets impact with fibers 2, they quickly coalesce into slots 10 while leaving open voids between fibers 2 and allowing for unencumbered airflow through fiber mat 100. Fibers 2 can alternatively wick reagent 12 up within slots 10 by capillary force by dipping fibers 2 into reagent 12 and removing excess reagent 12.

Reagent 12 can be formed into liquid droplets by different methods such as forcing reagent 12 through a mechanical atomizer or preferably by using a conventional liquid dropper. Reagent 12 can range from a variety of liquids such as acids, bases, oxidants, reductants, complexing agents, coordinating agents, and deliquescent agents.

Acids for use as reagent 12 include, for example, inorganic acids such as boric acid and preferably phosphoric or sulfuric acid. Organic acids may also be used rather than inorganic acids. Organic acids include, for example, moncarboxylic, dicarboxylic, and tricarboxylic acids; these types of organic acids include citric, lactic, malefic, fumaric, caproic, lauric, oxalic, malonic, tartaric, succinic, salicyclic, and malic acids. In another embodiment, powdered acids may also be used in place of the liquid acid and impregnated within slots 10 in a method similar to that described above for carbon powder. In an alternative embodiment, powdered bases may also be used to filter non-basic contaminants. Such powdered bases may include, e.g., sodium bicarbonate (baking soda), sodium carbonate, sodium hydroxide, trisodium phosphate, potassium carbonate, potassium hydroxide, and sodium tetraborate. Also, reagent 12 may include coordinating agents which comprise transition metals, e.g., copper, tin, iron, zinc, and titanium, and complexing agents which comprise entrapping agents, e.g., cyclodextrins.

Bases for use as reagent 12 include, for example, a group 1 or group 2 metal cation, and may also advantageously comprise a phosphate, chitosan, a hypochlorite, a borate, a carbonate, an hydroxide, or oxide. Particularly contemplated bases are sodium and potassium hydroxide, potassium and sodium phosphate, calcium or magnesium oxide or hydroxide, sodium or potassium carbonate.

Oxidizing agents contemplated herein include group 1 or 2 metal permanganate, hydrogen peroxides as well as other inorganic and organic peroxides, group 1 or 2 metal hypochlorites, metal oxides includes zinc, tin, iron, titanium, and so forth Complexing agents contemplated herein include urea, cyclodextrins, crown ethers, and so forth.

Coordinating agents contemplated herein include zinc and tin acetate, etc.

Deliquescing agents contemplated herein include lithium and potassium halides (including bromides and chlorides), fructose, propylene and ethylene glycols, etc.

Figure 3:
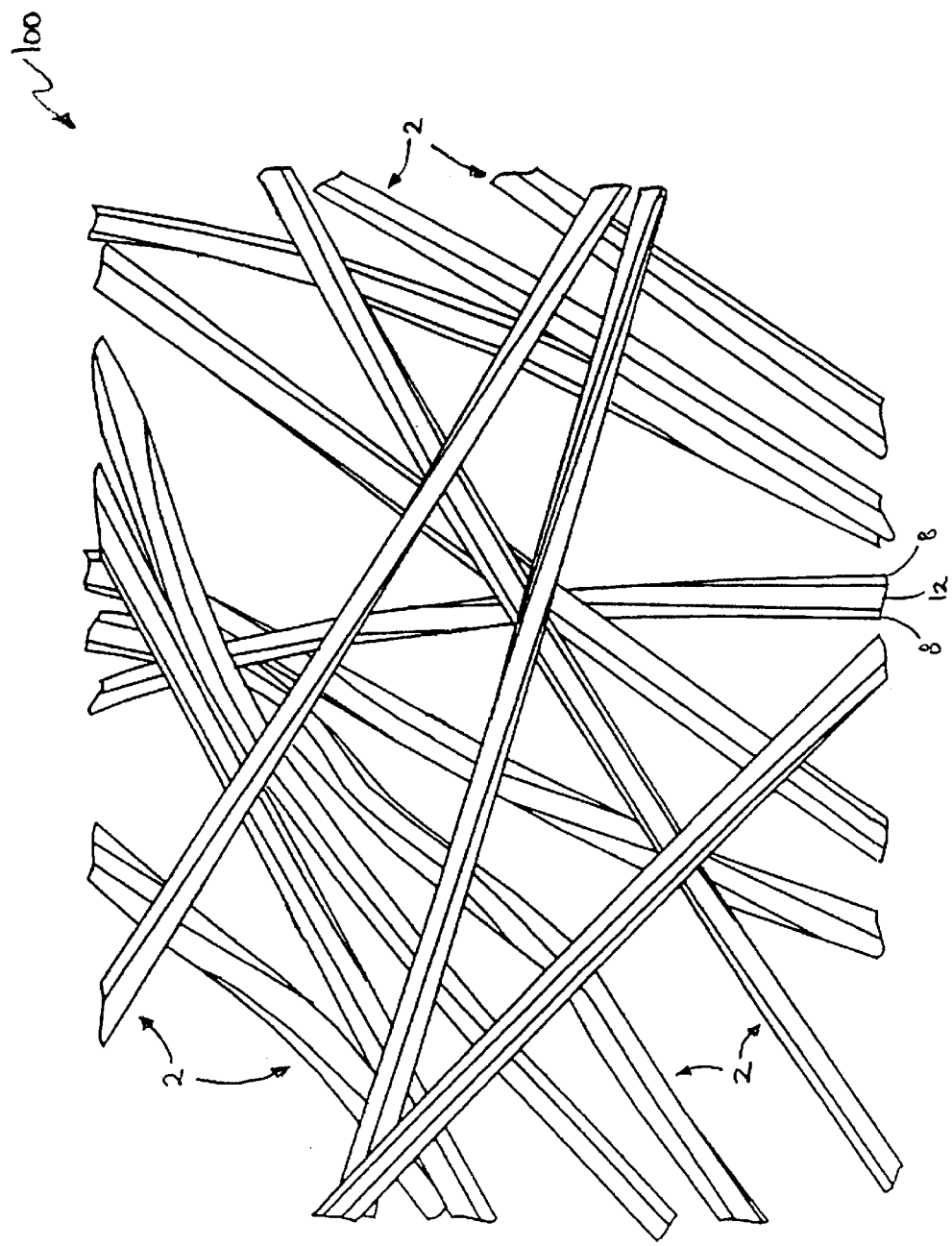
FIG. 3 shows a wider view of the fiber mat of FIG. 2.

FIG. 3 shows a wider view of fiber mat 100. Fibers 2 can be pleated or formed in layers to form fiber mat 100 in a variety of configurations. Generally, the volume within slot 10 makes up about half the volume of multilobal fiber 2 and depending upon the density of the contaminant, fibers 2 can gain around 100% in weight of liquid contaminants and anywhere from 25% to 125% in weight for solid powders within slots 10. Utilizing the multilobal fiber 2 property to capture both liquid or solid contaminants, reagent 12 is used for adsorptive and absorptive filtration applications. Reagents 12 are intentionally impregnated within slots 10 and can be a reactive liquid or a solid reagent, preferably both acid, and fiber mat 100 is used as a supportive network to hold reagents 12 in a highly dispersed configuration for adsorptive and absorptive molecular contaminant removal. Multilobal fiber 2 can retain not only a liquid or solid (acid) reagent 12, but is effective in also retaining a combination of a liquid reagent and solid particulates. Solid adsorbents such as zeolites, aluminum oxides, activated carbons (both impregnated and virgin), and chemically modified silicas can be combined with acid reagent 12, in either liquid or solid form, and impregnated within slots 10 of multilobal fibers 2. Solid adsorbents may also be used in combination with base reagent 12 and impregnated within slots 10.

Fiber mat 100 is particularly effective in filtering acid or base contaminants from a passing fluid stream. Contemplated acidic contaminants are any chemicals or compounds conventionally regarded as an acid in the chemical arts, including hydrogen ion donors and electron acceptors (Lewis acids). Contemplated basic contaminants are considered any chemicals or compounds conventionally regarded as a base in the chemical arts, including hydrogen ion acceptors and electron donors (Lewis bases). Particularly contemplated acid contaminants are mineral acids and organic acids, and especially including hydrochloric acids, sulfur oxide acids, organic acids. Particularly contemplated basic contaminants are ammonia and amines.

pH neutral contaminants can also be filtered using the inventive technology herein. Particularly contemplated pH neutral contaminants are arsenic and it derivatives, alcohols, hydrocarbons, and oxygenated hydrocarbons. Particularly contemplated reagents for such neutral contaminants are coordinating agents, oxidizing agents, and complexing agents.

A fiber mat 100 impregnated with liquid basic reagents 12 is particularly effective in specifically absorbing acidic contaminants, such as mineral or organic acids, including especially nitrogen or sulfur containing acids, sulfur oxides, nitrogen oxides, hydrogen sulfide) from a passing fluid stream. In an exemplary illustration, an air stream contaminated with sulfuric acid passes through fiber mat 100. As the contaminant passes over multilobal fibers 2 impregnated with a basic reagent 12 such as sodium hydroxide, the acid and base chemically react to form water and a non-volatile sodium sulfate salt. The fiber 2 then retains some or all of the salt.

Figure 4:
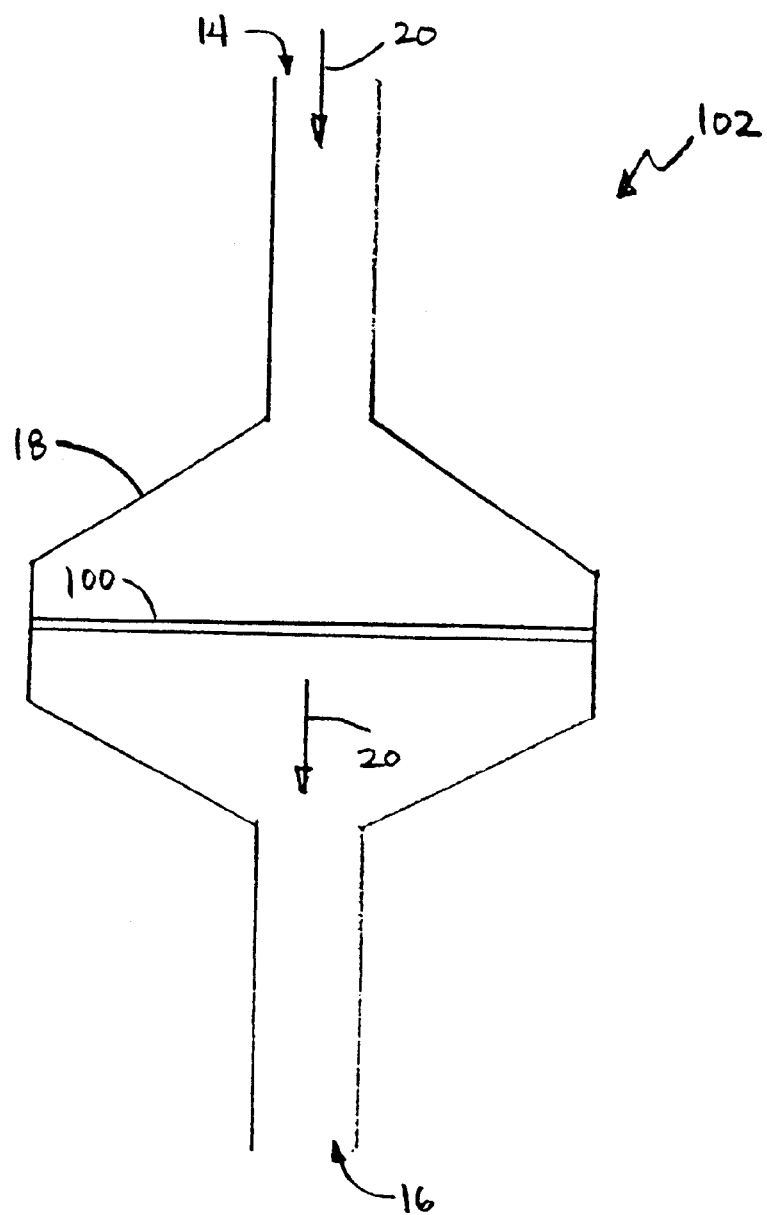
FIG. 4 shows a chamber in one embodiment for use in filtering an air stream with the acid-impregnated multilobal fiber filter.

Fiber mat 100 utilizing basic reagent 12 in multilobal fiber 2 can be used in a variety of applications, e.g., pleating or layering multilobal fiber 2 to form fiber mat 100. Fiber mat 100 can be used, in one embodiment, as a filtering element in a filtering chamber 102 as shown in FIG. 4. Chamber 102 consists of a housing 18, which can be designed from a conventional metal, e.g., aluminum, to accommodate handling and field installation. The pleated or layered fiber mat 100 is attached to housing 18, preferably by an adhesive or a low outgasing glue. It is also possible, in an alternative embodiment, to have fiber mat 100 attached to a frame (frame is not shown); this frame with fiber mat 100 can then be installed or removed interchangeably within housing 18.

Housing 18 also has an inlet 14 and an outlet 16 to allow an air stream 20 to pass through filtering chamber 102 while being filtered through fiber mat 100. Chamber 102 can be used to provide particle and/or chemical filtration.

Figure 5:
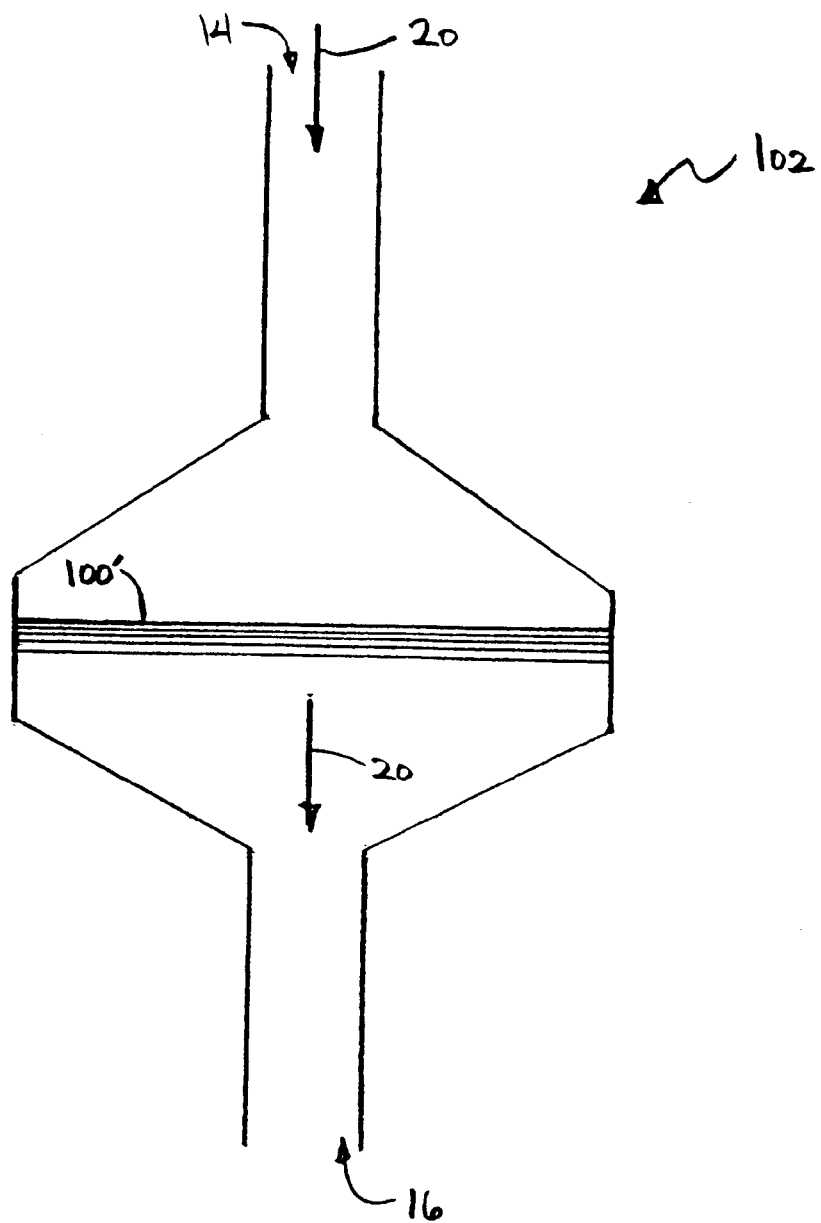
FIG. 5 shows the chamber of FIG. 4 with a mufti-layered multilobal fiber filter.

FIG. 5 shows an alternative embodiment of fiber mat 100. FIG. 6 is similar to chamber 102 in FIG. 4 in most respects except for the substitution of mufti-layered fiber mat 100' for fiber mat 100. Multi-layered fiber mat 100' is a filter composed of a number of individual adjacent layers. Each individual layer is impregnated with any of the reagents discussed above; and several individual layers, each layer with a different reagent, are combined into a single mufti-layered fiber mat. The number of layers can range from one to N and fiber mat 100' can contain any combination of layers and reagents depending upon the desired functionality.

Thus, specific embodiments and applications of devices and methods for chemical reactive filtration have been disclosed. It should be apparent, however, to those skilled in the art that many more modifications besides those described are contemplated without departing from the inventive concepts herein. The inventive subject matter, therefore, is not to be restricted except in the spirit of the appended claims.

What is claimed is:

1. A gas filter comprising:

a plurality of elongated fibers, each fiber defining a plurality of longitudinally extending internal cavities; and a reagent disposed within the internal cavities of the fibers, and selected from the group consisting of an oxidizing agent and a base.

2. The filter of claim 1, wherein the reagent comprises the base.

3. The filter of claim 1, wherein the reagent comprises a metal cation.

4. The filter of claim 1, wherein the reagent comprises a group 1 or group 2 metal cation.

5. The filter of claim 1, wherein the reagent comprises a phosphate, chitosan, a hypochlorite, a borate, a carbonate, an hydroxide, or an oxide.

6. The filter of claim 1, wherein the reagent is impregnated into an adsorptive solid.

7. The filter of claim 6 wherein the adsorptive solid comprises carbon powder.

8. The filter of claim 6 wherein the adsorptive solid is selected from the group consisting of zeolite, aluminum oxide, and silica.

9. The filter of claim 1 wherein each of the plurality of fibers are trilobal.

10. The filter of claim 1 wherein each of the plurality of fibers are quadrilobal.

11. The filter of claim 1 wherein each of the plurality of fibers contains a plurality of T shaped lobes.

12. A method of filtering an acidic or pH neutral gaseous contaminant from a gas with a filter, comprising:

providing the filter with a plurality of longitudinally extending internal cavities; and disposing a reagent within the internal cavities that reacts with the contaminant, the reagent is selected from the group consisting of an oxidizing agent, a base, a coordinating agent, a complexing agent, and a deliquescing agent.

13. The method of claim 12 wherein the contaminant is acidic.

14. The method of claim 12 wherein the contaminant is pH neutral.

15. The method of claim 12 wherein the reagent is an oxidizing agent.

16. The method of claim 12 wherein the reagent is a base.

17. The method of claim 12 wherein the reagent is a complexing agent.

18. The method of claim 12 wherein the reagent is a deliquescing agent.

19. The method of claim 12 wherein the reagent comprises a phosphate, a borate, a carbonate, an hydroxide, or an oxide.

20. The method of claim 12 wherein the reagent is impregnated into an adsorptive solid.

21. The method of claim 20 wherein the adsorptive solid comprises a powder.

22. The method of claim 12 wherein the cavities are defined by multilobal fibers.

23. The method of claim 22 wherein each of the plurality of fibers contains a plurality of T shaped lobes.

* * * * *